(12) United States Patent
Kim

(10) Patent No.: US 9,356,323 B2
(45) Date of Patent: May 31, 2016

(54) TEMPERATURE CONTROLLING SYSTEM AND METHOD FOR BATTERY

(71) Applicant: Samsung SDI Co., LTD., Yongin-si, Gyeonggi-do (KR)

(72) Inventor: Ki-Seon Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 162 days.

(21) Appl. No.: 13/935,462

(22) Filed: Jul. 3, 2013

(65) Prior Publication Data
US 2014/0197778 A1   Jul. 17, 2014

(30) Foreign Application Priority Data
Jan. 16, 2013 (KR) .................. 10-2013-0005046

(51) Int. Cl.
| H02J 7/00 | (2006.01) |
| H01M 10/44 | (2006.01) |
| H02J 7/04 | (2006.01) |
| H02J 3/32 | (2006.01) |
| H01M 10/42 | (2006.01) |

(52) U.S. Cl.
CPC ........... H01M 10/443 (2013.01); H02J 7/0024 (2013.01); H02J 7/047 (2013.01); H01M 2010/4271 (2013.01); H02J 3/32 (2013.01); H02J 7/007 (2013.01); H02J 7/0022 (2013.01); H02J 7/0031 (2013.01); H02J 7/0077 (2013.01); H02J 7/0093 (2013.01); H02J 7/04 (2013.01)

(58) Field of Classification Search
CPC ....... H02J 7/007; H02J 7/0077; H02J 7/0093; H02J 7/04; H02J 7/047; H02J 7/0022; H02J 7/0024; H02J 7/0031

USPC ......... 320/127–129, 134, 137, 143–144, 150, 320/153
See application file for complete search history.

(56) References Cited

U.S. PATENT DOCUMENTS

| 4,016,473 | A | * | 4/1977 | Newman | 320/129 |
| 5,623,195 | A | * | 4/1997 | Bullock et al. | 320/153 |
| 5,900,717 | A | * | 5/1999 | Lee | 320/150 |
| 6,078,163 | A | * | 6/2000 | Horie et al. | 320/104 |
| 6,259,229 | B1 | * | 7/2001 | Ashtiani et al. | 320/128 |
| 6,271,648 | B1 | * | 8/2001 | Miller | 320/150 |
| 6,340,879 | B1 | * | 1/2002 | Blacker | 320/153 |

(Continued)

FOREIGN PATENT DOCUMENTS

| JP | 2000-228231 A | 8/2000 |
| JP | 2011-254673 | 12/2011 |

(Continued)

*Primary Examiner* — Stacy Whitmore
(74) *Attorney, Agent, or Firm* — Lewis Roca Rothgerber Christie LLP

(57) ABSTRACT

The present invention provides a temperature controlling system for a battery in an energy storage system, the temperature controlling system including: a converter comprising a plurality of switches and a converter inductor, the converter being configured to increase or decrease a voltage of the battery; a DC linker comprising first and second capacitors that are coupled in series and configured to stabilize an output voltage of the converter; and an inverter comprising a plurality of switches and an inductor, the inverter being configured to invert an input voltage, wherein the inverter further comprises a switch coupled between a terminal of the inductor and a first node between the first and second capacitors of the DC linker to provide a current from the inductor to the battery.

12 Claims, 3 Drawing Sheets

(56) References Cited

U.S. PATENT DOCUMENTS

| | | | |
|---|---|---|---|
| 6,441,588 B1* | 8/2002 | Yagi et al. | 320/139 |
| 6,501,250 B2* | 12/2002 | Bito et al. | 320/152 |
| 6,850,039 B2* | 2/2005 | Popescu | 320/134 |
| 7,327,122 B2* | 2/2008 | Kamenoff | 320/150 |
| 7,737,658 B2 | 6/2010 | Sennami et al. | 320/128 |
| 8,212,412 B1* | 7/2012 | Benedict et al. | 307/87 |
| 8,368,345 B2* | 2/2013 | Wahlqvist et al. | 320/101 |
| 8,450,966 B2* | 5/2013 | Krauer et al. | 320/104 |
| 8,452,490 B2* | 5/2013 | Lakirovich et al. | 701/36 |
| 8,604,746 B2* | 12/2013 | Lee | 320/101 |
| 8,741,456 B2* | 6/2014 | Tezuka et al. | 429/50 |
| 8,816,634 B2* | 8/2014 | Xu et al. | 320/107 |
| 8,816,647 B2* | 8/2014 | Xu et al. | 320/150 |
| 8,890,467 B2* | 11/2014 | Almquist et al. | 320/104 |
| 8,907,631 B1* | 12/2014 | Gurries et al. | 320/138 |
| 8,941,356 B2* | 1/2015 | Xu et al. | 320/128 |
| 8,947,049 B2* | 2/2015 | Han et al. | 320/128 |
| 2002/0070710 A1* | 6/2002 | Yagi et al. | 320/150 |
| 2006/0071634 A1* | 4/2006 | Meyer et al. | 320/112 |
| 2007/0120537 A1* | 5/2007 | Yamamoto | 320/150 |
| 2008/0231205 A1* | 9/2008 | Yang et al. | 315/219 |
| 2009/0315396 A1 | 12/2009 | Ichikawa et al. | |
| 2010/0231173 A1* | 9/2010 | Andrea et al. | 320/137 |
| 2011/0175451 A1 | 7/2011 | Moon | |
| 2011/0291606 A1* | 12/2011 | Lee | 320/101 |
| 2011/0298427 A1* | 12/2011 | Uemura et al. | 320/134 |
| 2011/0304212 A1 | 12/2011 | Choi et al. | |
| 2012/0013192 A1 | 1/2012 | Park et al. | |
| 2012/0025762 A1* | 2/2012 | Lienkamp et al. | 320/109 |
| 2012/0112695 A1* | 5/2012 | Nishi et al. | 320/109 |
| 2012/0123626 A1* | 5/2012 | Takahashil et al. | 701/22 |
| 2012/0126753 A1* | 5/2012 | Carkner | 320/129 |
| 2012/0153877 A1* | 6/2012 | Baba et al. | 318/139 |
| 2012/0280658 A1* | 11/2012 | Xu et al. | 320/128 |
| 2013/0113437 A1* | 5/2013 | Ishibashi et al. | 320/136 |
| 2013/0134945 A1* | 5/2013 | Xu et al. | 320/136 |
| 2013/0249479 A1* | 9/2013 | Partovi | 320/108 |
| 2014/0087215 A1 | 3/2014 | Kim | |
| 2014/0210417 A1* | 7/2014 | Kim | 320/130 |
| 2014/0239903 A1* | 8/2014 | Choi | 320/128 |
| 2014/0285155 A1* | 9/2014 | Choi | 320/130 |

FOREIGN PATENT DOCUMENTS

| | | |
|---|---|---|
| KR | 10-2009-0043529 A | 5/2009 |
| KR | 10-2011-0084751 | 7/2011 |
| KR | 10-2011-0136167 | 12/2011 |
| KR | 10-2012-0007224 A | 1/2012 |

* cited by examiner

TEMPERATURE CONTROLLING SYSTEM AND METHOD FOR BATTERY

CROSS-REFERENCE TO RELATED APPLICATION

This application claims priority to and the benefit of Korean Patent Application No. 10-2013-0005046, filed on Jan. 16, 2013, in the Korean Intellectual Property Office, the entire content of which is incorporated herein by reference.

BACKGROUND

1. Field

Aspects of the present invention relates to a temperature controlling system and method for a battery.

2. Description of the Related Art

Concerns over environmental disruption, and the depletion of natural resources have given rise to an interest in electric power systems capable of efficiently storing and providing electric power. In addition, in recent years, there has been increased interest in developing electric power systems that utilize renewable energy sources (e.g., sunlight, wind power, or tidal power) as sources of electric power, which may provide a nearly infinite supply of power while reducing reliance on finite natural resources as sources for electric power. Furthermore, generating electricity from renewable energy sources may significantly reduce harmful impacts on the environment.

An energy storage system is a system that couples a renewable energy source, a power storing battery, and existing power from a grid, and much research has been conducted on such systems in order to reduce or minimize harmful effects on the environment.

The battery provided in the energy storage system is implemented as a rechargeable secondary battery. The battery functions normally at normal operating temperatures, but the power output of the battery operating at very low temperatures (e.g., −20° C. or less) is only about 16% of that of the battery at normal operating temperatures.

One method for improving power output of the battery at very low temperatures is to use a heater or heat generated by a resistor or electronic load so as to increase the temperature of a battery.

However, as the power of the battery is consumed, the use rate of the battery is lowered, and applying heat to the battery may increase the risk of a fire.

SUMMARY

Embodiments of the present invention provide a battery temperature controlling system, in which a switch is additionally configured in an energy storage system, so that the charging/discharging current path to the battery is controlled, thereby controlling the temperature of the battery. Embodiments of the present invention also provide a method for controlling a temperature of a battery, in which when the low-temperature state of the battery is sensed in the operation of an energy storage system, the coupling to a grid is cut off, and charging/discharging current is generated in the battery using an inductor of an inverter, thereby increasing the temperature of the battery According to one embodiment of the present invention, there is provided a temperature controlling system for a battery in an energy storage system, the temperature controlling system including: a converter including a plurality of switches and a converter inductor, the converter being configured to increase or decrease a voltage of the battery; a DC linker including first and second capacitors that are coupled in series and configured to stabilize an output voltage of the converter; and an inverter including a plurality of switches and an inductor, the inverter being configured to invert an input voltage, wherein the inverter further comprises a switch coupled between a terminal of the inductor and a first node between the first and second capacitors of the DC linker to provide a current from the inductor to the battery.

The converter may include the converter inductor coupled to a first terminal of the battery; a first switch coupled between a first terminal of the first capacitor of the DC linker and a second terminal of the converter inductor; and a second switch coupled between the second terminal of the converter inductor and a second terminal of the battery.

The temperature controlling system may further include a third switch coupled between the first terminal of the battery and the first terminal of the first capacitor of the DC linker.

The switches of the inverter may be implemented in a half-bridge structure.

The switches of the half-bridge structure may include a first switch coupled between a first terminal of the first capacitor of the DC linker and a first terminal of the inductor; and a second switch coupled between the first terminal of the inductor and a second terminal of the battery.

The inductor may be coupled between a second node between the first and second switches and a first switch of a load linker, the load linker being configured to control a linkage between the energy storage system and a load.

The temperature controlling system may further include a third switch coupled between a second terminal of the inductor and the first node between the first and second capacitors of the DC linker.

According to another embodiment of the present invention, there is provided a temperature controlling method for a battery provided in an energy storage system, including: sensing a low-temperature state of the battery being maintained for a period of time; removing a coupling between a grid and a load from the energy storage system in response to the low-temperature state of the battery being maintained for the period of time; forming a charging/discharging current path through which current generated in an inductor is provided to the battery; and repetitively performing a charging/discharging operation of the battery through the charging/discharging current path by alternately operating a plurality of switches of an inverter.

The temperature controlling method may further include coupling the energy storage system to the load and the grid after the temperature of the battery reaches a normal temperature range and blocking the formed charging/discharging current path.

The plurality of switches of the inverter may be implemented in a half-bridge structure.

As described above, according to the present invention, the charging/discharging current path of the battery is controlled by adding a switch to the energy storage system, so that it is possible to prevent the battery provided in the energy storage system from being left in a low-temperature state without implementing a complicated circuit so as to increase the temperature of the battery.

Further, it is possible to easily implement the conversion between a basic operation of the energy storage system and an operation for controlling the temperature of the battery.

BRIEF DESCRIPTION OF THE DRAWINGS

The accompanying drawings, together with the specification, illustrate exemplary embodiments of the present inven

DETAILED DESCRIPTION

Figure 1:
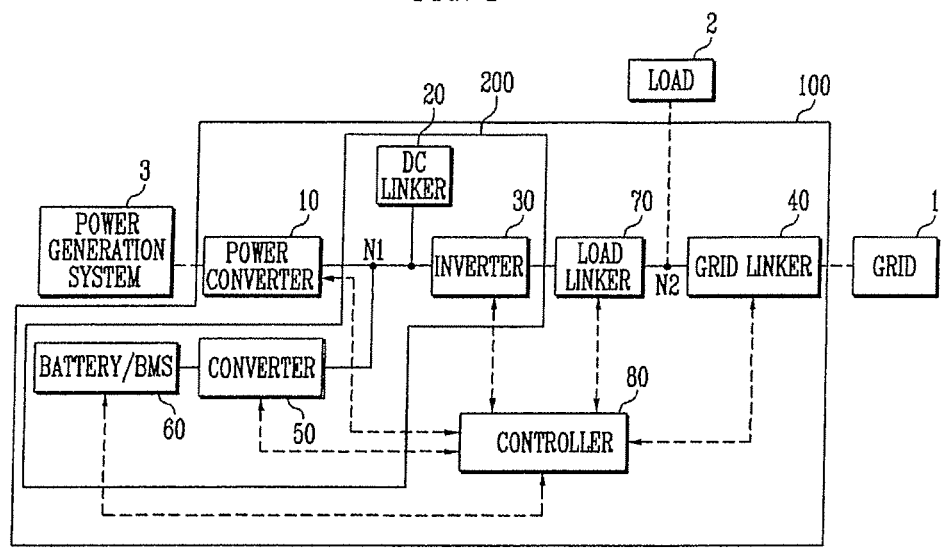
- FIG. 1 is a block diagram illustrating an energy storage system including a temperature controlling system of a battery according to an embodiment of the present invention.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

FIG. 1 is a block diagram illustrating an energy storage system including a temperature controlling system of a battery according to an embodiment of the present invention.

That is, as shown in FIG. 1, the temperature controlling system according to this embodiment is a configuration included in an energy storage system. The temperature controlling system prevents or reduces the battery provided in the energy storage system from being left in a low-temperature state, and performs an operation of increasing the temperature of the battery in the low-temperature state.

Referring to FIG. 1, the energy storage system 100 according to this embodiment supplies electric power to a load 2 in linkage with a power generation system 3 and a grid 1.

The power generation system 3 is a system that generates electric power using an energy source, e.g., a renewable energy source. The power generation system 3 supplies the generated electric power to the energy storage system 100. The power generation system 3 may be any suitable power generation system, including a renewable energy power generation system, such as a solar power generation system, a wind power generation system, a tidal power generation system, or the like. In addition, the power generation system 3 may include all power generation systems that generate electric power using renewable energy such as solar heat or subterranean heat.

Particularly, solar cells that generate electrical energy using sunlight are relatively easily installed in homes or factories, and thus it is suitable to apply the electrical power generated by solar cells installed in homes to the energy storage system 100. The power generation system 3 has a plurality of power generation modules coupled in parallel and generates electric power for each power generation module, thereby constituting a large-capacity energy system.

The grid 1 includes power stations, transformer substations, power transmission lines, and the like. In a case where the grid 1 is in a normal state, the grid 1 supplies electric power to the energy storage system 100 or the load 2, and receives electric power supplied from the energy storage system 100. In a case where the grid 1 is in an abnormal state, the supply of the electric power from the grid 1 to the energy storage system 100 or the load 2 is stopped, and the supply of the electric power from the energy storage system 100 to the grid 1 is also stopped.

The load 2 consumes electric power generated from the power generation system 3, electric power stored in a battery 60 within the energy storage system 100, or electric power supplied from the grid 1. For example, the load 2 may be a home, a factory, or the like.

The energy storage system 100 stores the electric power generated in the power generation system 3 in the internal battery 60, and may transmit the generated electric power to the grid 1. The energy storage system 100 may transmit the electric power stored in the battery 60 to the grid 1 or may store the electric power supplied from the grid 1 in the battery 60. The energy storage system 100 may supply electric power to the load 2 by performing an uninterruptible power supply (UPS) operation in an abnormal situation, e.g., when a power failure of the grid 1 occurs. Additionally, the energy storage system 100 may supply, to the load 2, the electric power generated in the power generation system 3 or the power stored in the battery 60, even in a state in which the grid 1 is operating normally.

The energy storage system 100 includes a power converter 10, a DC linker 20, an inverter 30, a converter 50, a battery and battery management system (BMS) 60, a grid linker 40, a load linker 70 and a controller 80. The inverter 30 and the converter 50 may be implemented as a bidirectional inverter 30 and a bidirectional converter 50, respectively.

The power converter 10 is coupled between the power generation system 3 and a first node N1, and functions to converts the electric power generated in the power generation system 3 into a DC voltage at the first node N1. The operation of the power converter 10 is changed depending on the electric power generated in the power generation system 3. For example, in a case where the power generation system 3 generates an AC voltage, the power converter 10 converts the AC voltage into the DC voltage at the first node N1. In a case where the power generation system 3 generates a DC voltage, the power converter 10 boosts or drops the DC voltage to a second DC voltage level at the first node N1.

For example, in a case where the power generation system 3 is a solar generation system, the power converter 10 may be a maximum power point tracking (MPPT) converter that detects the maximum power point according to a change in the amount of sunlight or a change in the temperature of solar heat and generates electric power. In addition, various kinds of converters or rectifiers may be used as the power converter 10.

The DC linker 20 is coupled between the first node N1 and the bidirectional inverter 30 so as to constantly maintain a DC link voltage Vlink at the first node N1. The voltage level at the first node N1 may be unstable due to substantially instantaneous voltage drops of the power generation system 3 or the grid 1, the occurrence of a peak load in the load 2, etc. However, the voltage at the first node N1 is necessarily maintained substantially constant so that the bidirectional inverter 30 and the bidirectional converter 50 are stably operated. To this end, the DC linker 20 may use, for example, a capacitor such as an electrolytic capacitor, polymer capacitor, or multilayer ceramic capacitor (MLCC).

The battery 60 receives electric power generated in the power generation system 3 or electric power supplied from the grid 1, stores the received electric power, and supplies the stored electric power to the load 2 or the grid 1. The battery 60 may include at least one battery cell, and each battery cell may include a plurality of bare cells. The battery 60 may be implemented with various kinds of battery cells. For example, the battery 60 may be a nickel-cadmium battery, lead storage battery, nickel metal hydride battery (NiMH), lithium ion battery, lithium polymer battery, etc.

The BMS is coupled to the battery 60, and controls charging and discharging operations of the battery 60 under the control of the controller 80. The BMS may perform an overcharging protection function, an over-discharging protection function, an overcurrent protection function, an overheating protection function, a cell balancing function, etc. so as to protect the battery 60. To this end, the BMS may monitor voltage, current, temperature, remaining power amount, lifespan and charging state of the battery 60 and transmit relevant information to the controller 80. Although it has been described in the embodiment of FIG. 1 that the BMS is configured as a battery pack integrated with the battery 60, the BMS may be provided to be separated from the battery 60.

The converter 50 DC-DC converts the voltage of power output from the battery 60 into a voltage level required in the inverter 30, i.e., the DC link voltage Vlink. The converter 50 also DC-DC converts a charging power flowing through the first node N1 into a voltage level required in the battery 60. Here, the charging power refers to, for example, electric power generated in the power generation system 3 or electric power supplied from the grid 1 through the inverter 30.

The inverter 30 is a power converter provided between the first node N1 and a second node N2. The load 2 and the grid linker 40 are also coupled to the second node N2. The inverter 30 converts the DC link voltage Vlink output from the power generation system or the battery 60 into an AC voltage and outputs the converted AC voltage. In order to store the power output from the grid 1 in the battery 60, the inverter 30 rectifies the AC voltage, converts the rectified AC voltage into the DC link voltage Vlink and outputs the converted DC link voltage Vlink. The inverter 30 may include a filter for removing harmonics from the AC voltage output from the grid 1. The inverter 30 may include a phase locked loop (PLL) circuit for synchronizing the phase of the AC voltage output from the inverter 30 and the phase of the AC voltage output from the grid 1 in order to prevent the generation of reactive power. In addition, the inverter 30 may perform functions such as limitation of voltage variation ranges, improvement of power factors, removal of DC components, protection of transient phenomena, etc.

The grid linker 40 is coupled between the grid 1 and the inverter 30. In a case where an abnormal situation occurs in the grid 1, the grid linker 40 intercepts the link between the energy storage system 100 and the grid 1 under the control of the controller 80. The grid linker 40 may be implemented as a switching element, and the switching element may be a bipolar junction transistor (BJT), field effect transistor (FET), etc.

The load linker 70 is coupled between the inverter 30 and the load 2. The load linker 70 is also coupled in series to the grid linker 40, and cuts off electric power flowing into the load 2 under the control of the controller 80. The load linker 70 may also be implemented as a switching element, and the switching element may be a BJT, FET, etc.

In this embodiment, the battery 60, the converter 50, the DC linker 20, and the inverter 30 among the components of the energy storage system 100 constitute a temperature controlling system 200 of the battery 60.

That is, in this embodiment, a switch is added to the inverter 30 so as to regulate the path of charging/discharging current to the battery 60, thereby controlling the temperature of the battery 60.

Accordingly, if the controller 80 detects that the low-temperature state of the battery 60 is maintained for a certain period of time during the operation of the energy storage system 100, the controller 80 performs an operation of increasing the temperature of the battery 60 by cutting off the coupling between the grid 1 and the load 2 and generating charging/discharging current to the battery 60 using an inductor (shown, e.g., in FIG. 2) of the inverter 30 at the output terminal of the energy storage system 100.

In this embodiment, in addition to the switch added to the inverter 30, a switch may be further added to the converter 50, and the operations of the added switches are controlled by the controller 80.

The configuration and operation of the temperature controlling system 200 according to this embodiment will be described in detail with reference to FIGS. 2 and 3.

Figure 2:
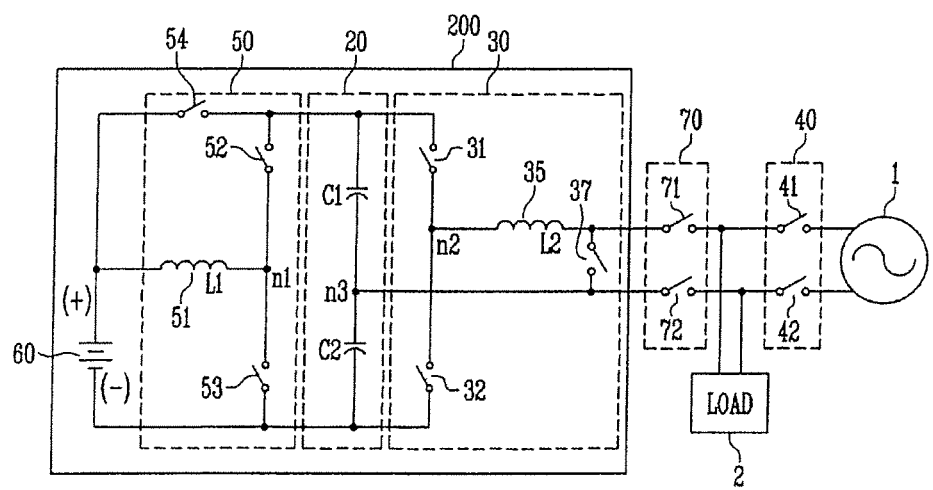
FIG. 2 is a circuit diagram illustrating an embodiment of the temperature controlling system shown in FIG. 1.

FIG. 2 is a circuit diagram illustrating an embodiment of the temperature controlling system shown in FIG. 1.

Referring to FIG. 2, the temperature controlling system 200 according to this embodiment is configured with the battery 60, the converter 50, and the DC linker 20 and the inverter 30 among the components of the energy storage system shown in FIG. 1. The load linker 70 and the load 2, coupled to the temperature controlling system 200, the grid linker 40 and the grid 1 are shown in FIG. 2.

Although only the battery 60 is shown in FIG. 2 for convenience of illustration, the BMS may be included in the battery 60.

The converter 50, as shown in FIG. 2, is configured with first and second switches 52 and 53 and one converter inductor L1 51 so as to perform a bidirectional converting operation. In addition, the converter 50 is configured with a third switch 54 coupled in parallel to the converter inductor L1 51, thereby forming a charging/discharging current path immediately to the battery 60 without passing through the converter inductor L1 51.

The converter inductor L1 51 may be implemented as a coil as shown in FIG. 2. The converter inductor L1 51 includes a first terminal coupled to a first terminal (+) of the battery 60, and a second terminal coupled to a node n1 between the first and second switches 52 and 53.

The first switch 52 is coupled between a first terminal of a first capacitor C1 included in the DC linker 20 and the second terminal of the converter inductor L1 51. That is, a first terminal of the first switch 52 is coupled to the first terminal of the first capacitor C1, and a second terminal of the first switch 52 is coupled to the second terminal of the converter inductor L1 51.

The second switch 53 is coupled between the second terminal of the converter inductor L1 51, a second terminal of a second capacitor C2 included in the DC linker 20, and a second terminal (−) of the battery 60. That is, a first terminal of the second switch 53 is coupled to the second terminal of the converter inductor L1 51, and a second terminal of the second switch 53 is coupled to the second terminal of the second capacitor C2 and the second terminal (−) of the battery 60.

The first or second switch 52 or 53 may be implemented, for example, as an insulated gate bipolar transistor (IGBT) or MOSFET switch. In addition, any suitable switching element capable of performing the switching function may be used as the first or second switch 52 or 53. In a case where the first or second switch 52 or 53 is a MOSFET switch, the first terminal of the switch 52 or 53 may be a source terminal, and the second terminal of the switch 52 or 53 may be a drain terminal.

The converter 50 configured as described above may perform an operation of the bidirectional converter that acts as a boost converter boosting the voltage of input power or a buck converter dropping the voltage of input power.

The converter 50 according to this embodiment performs a general bidirectional converting operation, and is configured with the third switch 54 coupled in parallel to the converter inductor L1 51 so as to form the charging/discharging current path to (e.g., immediately to) the battery 60 without passing through the converter inductor L1 51.

That is, the converter 50, as shown in FIG. 2, further includes the third switch 54 that couples the first terminal (+) of the battery 60 and the first terminal of the first capacitor C included in the DC linker 20.

Thus, if the third switch 54 is turned on, the charging/discharging current path is formed immediately to the battery 60 without passing through the converter inductor L1 51.

In this case, the turn-on/off of the first to third switches 52, 53, and 54 are controlled by the controller 80 shown in FIG. 1.

Next, a case where the inverter 30 is implemented in a half-bridge structure configured with two switches 31 and 32 as shown in FIG. 2 will be described as an example.

The inverter 30 according to this embodiment is not limited thereto, and it will be apparent that the inverter 30 may be configured in a full-bridge or push-pull structure or may be configured with four or more switching elements.

More specifically, the inverter 30, as shown in FIG. 2, is configured with the first and second switches 31 and 32 and one inductor (or inverter inductor) L2 35 so as to perform a bidirectional inverting operation. In addition, the inverter 30 is configured with a third switch 37 coupling one terminal (e.g., the second terminal) of the inverter inductor L2 35 to a node n3 between the first and second capacitors C1 and C2 constituting the DC linker 20, thereby generating charging/discharging current provided to the battery 60 using inverter conductor L2 35.

In this case, the inverter inductor L2 35, as shown in FIG. 2, may be implemented as a coil. The inverter inductor L2 35 may include a first terminal coupled to a node n2 between the first and second switches 31 and 32 that are switches of the half-bridge structure, and a second terminal coupled to a first terminal of the third switch 37.

That is, if the third switch 37 is turned on, the second terminal of the inverter inductor L2 35 is coupled to the node n3 between the first and second capacitors C1 and C2 constituting the DC linker 20.

Among the switches of the half-bridge structure, the first switch 31 is coupled between the first terminal of the first capacitor C1 included in the DC linker 20 and the first terminal of the inverter inductor L2 35. That is, a first terminal of the first switch 31 is coupled to the first terminal of the first capacitor C1, and a second terminal of the first switch 31 is coupled to the first terminal of the inverter conductor L2 35.

The second switch 32 is coupled between the first terminal of the inverter inductor L2 35, the second terminal of the second capacitor C2 included in the DC linker 20, and the second terminal (−) of the battery 60. That is, a first terminal of the second switch 32 is coupled to the first terminal of the inverter inductor L2 35, and a second terminal of the second switch 32 is coupled to the second terminal of the second capacitor C2 and the second terminal (−) of the battery 60.

The first or second switches 31 or 32 may be implemented as an insulated gate bipolar transistor (IGBT) or MOSFET switch. In addition, any suitable switching element capable of performing the switching function may be used as the first or second switch 31 or 32. In a case where the first or second switch 31 or 32 is a MOSFET switch, the first terminal of the switch 31 or 32 may be a source terminal, and the second terminal of the switch 31 or 32 may be a drain terminal.

The inverter 30 configured as described above may perform a bidirectional inverting operation of converting DC voltage into AC voltage or rectifying AC voltage to DC voltage.

The inverter 30 according to this embodiment performs a general bidirectional inverting operation, and is further configured with the third switch 37 that couples the second terminal of the inverter inductor L2 35 to the node n3 between the first and second capacitors C1 and C2 constituting the DC liner 20 so as to generate charging/discharging current provided to the battery 60 using the inverter inductor L2 35.

That is, in the embodiment shown in FIG. 2, the third switch 37 is configured to couple the second terminal of the inverter inductor L2 35 and the node n3 between the first and second capacitors C1 and C2 constituting the DC linker 20.

Thus, if the third switch 37 is turned on, the current generated in the inverter inductor L2 35 can be provided to the battery 60 rather than the load 2 or the grid 1.

To this end, switches 71 and 72 provided in the load linker 70 and switches 41 and 42 provided in the grid linker 40 are all turned off so that the voltage converted by the inverter 30 is not provided to the load 2 or the grid 1.

In this case, the turn-on/off of the first to third switches 31, 32, and 37 of the inverter 30 and the switches 41 and 42 provided in the grid linker 40 are controlled by the controller 80 shown in FIG. 1.

The operation of the temperature controlling system according to this embodiment is an operation corresponding to a case where the low-temperature state of the battery 60, maintained for a certain period of time, is sensed by the controller 80 in the operation of the energy storage system 100.

That is, since the controller 80 periodically receives information on the battery 60 through the BMS coupled to the battery 60, the controller 80 can sense that the low-temperature state of the battery 60 is maintained for a certain period of time.

If the low-temperature state of the battery 60 is sensed by the controller 80, the controller 80 controls the operation of the temperature controlling system 200 shown in FIG. 2 so as to increase the temperature of the battery 60. In this case, the basic operation of the energy storage system 100 is reserved until the battery 60 returns to a normal operating temperature.

During the period of controlling the temperature of the battery 60, the controller 80 performs the operation of increasing the temperature of the battery 60 by cutting off the coupling between the grid 1 and the load 2 and allowing charging/discharging current to be generated in the battery 60 using the inverter inductor L2 35 of the inverter 30 at the output terminal of the energy storage system 100.

Referring to FIGS. 1 and 2, if the controller 80 senses the low-temperature state of the battery 60 through the BMS provided to the battery 60, the controller 80 blocks the linkage (e.g., coupling) between the energy storage system 100 with the load 2 and the grid 1 by turning off the switches 71 and 72 of the load linker 70 and the switches 41 and 42 of the grid linker 40.

The third switch 37 included in the inverter 30 is turned on, thereby coupling the second terminal of the inverter inductor L2 35 provided in the inverter 30 to the node n3 between the first and second capacitors C1 and C2 constituting the DC linker 20.

The third switch 54 included in the converter 50 is turned on, thereby forming a current path so that the battery 60 is coupled to (e.g., directly to) the inverter 30 without passing through the converter inductor L1 51 of the converter 50.

Subsequently, the two switches of the half-bridge structure, provided in the inverter 30, are alternately operated, thereby repetitively performing the charging/discharging operation of the battery.

Figure 3A:
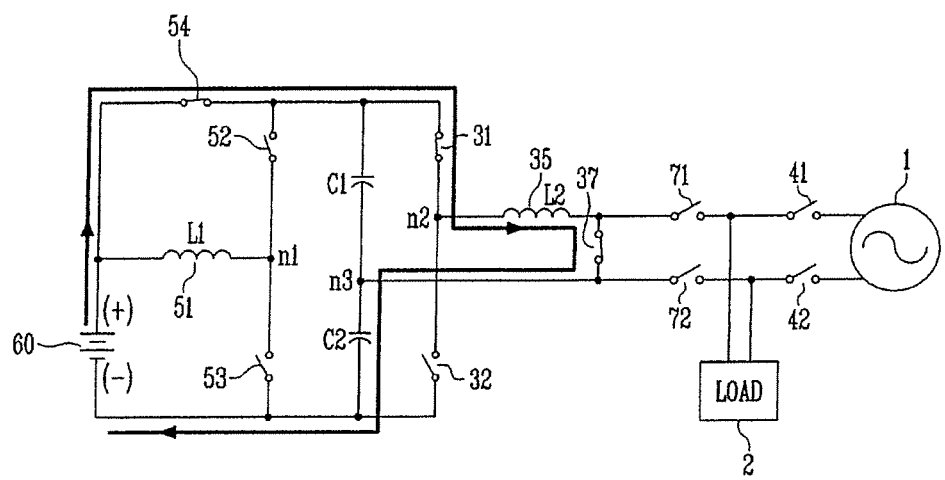
FIGS. 3A and 3B are circuit diagrams illustrating an operation of the temperature controlling system according to an embodiment of the present invention.
Figure 3B:
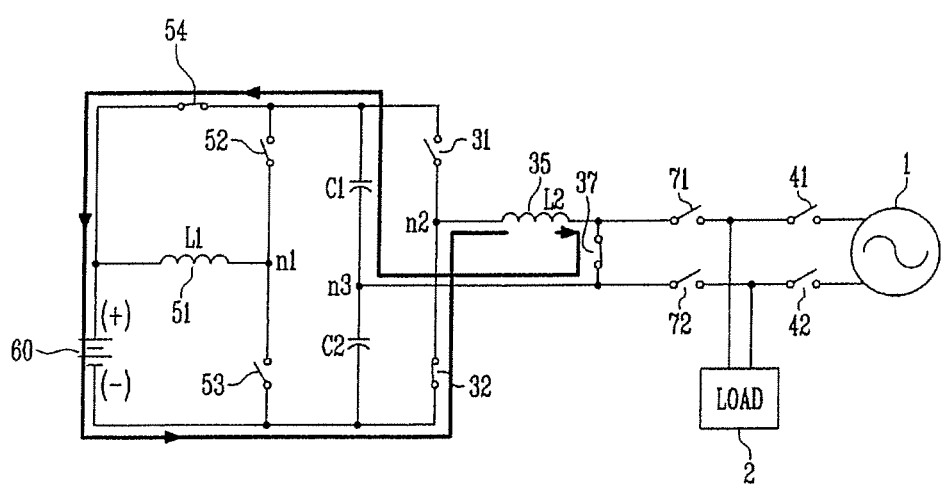

FIGS. 3A and 3B are circuit diagrams illustrating an operation of the temperature controlling system according to an embodiment of the present invention.

In the embodiment shown in FIGS. 3A and 3B, the controller 80 first turns on the first switch 31 and turns off the second switch 32 among the switches included in the inverter 30.

Referring to FIG. 3A, if the controller 80 turns on the first switch 31 and turns on the second switch 32, a discharging path is formed from the first terminal (+) of the battery 60 to the second terminal (−) of the battery 60 via the third switch 54 of the converter 50, the first terminal of the first capacitor C1 provided in the DC linker 20, the first switch 31, the inverter inductor L2 35 and the third switch 37 of the inverter 30, and the second capacitor C2 of the DC linker 20.

That is, according to FIG. 3A, discharging current flows from the battery 60 through the discharging path.

Referring to FIG. 3B, the controller 80 turns on the second switch 32 and turns off the first switch 31 among the switches included in the inverter 30.

In this case, a charging path having the opposite direction to that of the discharging path of FIG. 3A is formed. Accordingly, the electric power stored in the inverter inductor L2 35 of the inverter 30 is provided to the battery 60, so that the battery 60 can be charged.

That is, according to FIG. 3B, charging current flows into the battery 60 through the charging path.

The charging path, as shown in FIG. 3B, is formed from the second terminal (−) of the battery 60 to the first terminal (+) of the battery 60 via the second switch 32, the inverter inductor L2 35 and the third switch 37 of the inverter 30, the first capacitor C1 provided in the DC linker 20, and the third switch 54 of the converter 50.

Figure 4A:
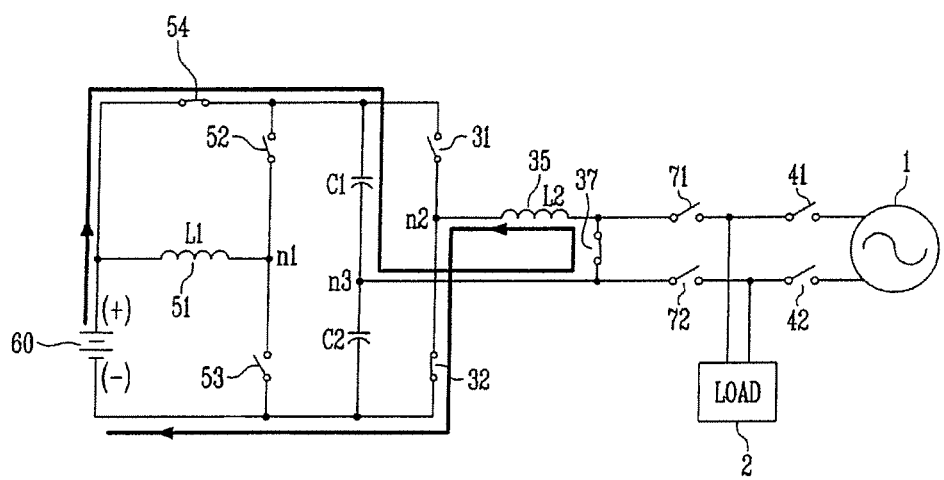
FIGS. 4A and 4B are circuit diagrams illustrating an operation of the temperature controlling system according to another embodiment of the present invention.
Figure 4B:
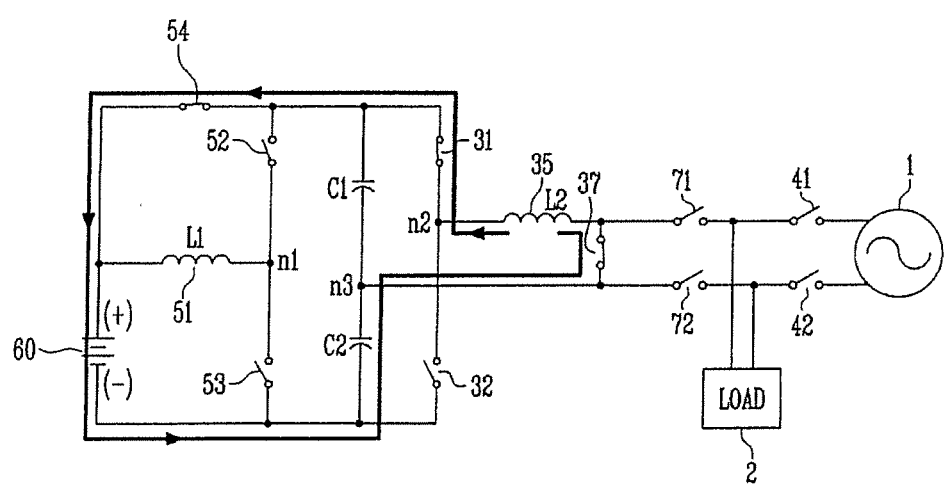

FIGS. 4A and 4B are circuit diagrams illustrating an operation of the temperature controlling system according to an embodiment of the present invention.

In the embodiment shown in FIGS. 4A and 4B, the controller 80 first turns on the second switch 32 and turns off the first switch 31 among the switches included in the inverter 30.

Referring to FIG. 4A, the controller 80 turns on the second switch 32 and turns off the first switch 31, a discharging path is formed from the first terminal (+) of the battery 60 to the second terminal (−) of the battery 60 via the third switch 54 of the converter 50, the first capacitor C1 provided in the DC linker 20, the third switch 37, the inverter inductor L2 35, and the second switch 32 of the inverter 30.

That is, according to FIG. 4A, discharging current flows into the battery 60 through the discharging path.

Referring to FIG. 4B, the controller 80 turns on the first switch 31 and turns off the second switch 32 among the switches included in the inverter 30.

In this case, a charging path having the opposite direction to that of the discharging path of FIG. 4A is formed. Accordingly, the electric power stored in the inverter inductor L2 35 of the inverter 30 is provided to the battery 60, so that the battery 60 can be charged.

That is, according to FIG. 4B, charging current flows into the battery 60 through the charging path.

The charging path, as shown in FIG. 4B, is formed from the second terminal (−) of the battery 60 to the first terminal (+) of the battery 60 via the second capacitor C2 provided in the DC linker 20, the third switch 37, the inverter inductor L2 35 and the first switch 31 of the inverter, and the third switch 54 of the converter 50.

As described above, in the battery controlling system according to this embodiment, the charging/discharging operation is repetitively performed by alternately operating the two switches of the half-bridge structure, provided in the inverter 30. Although it has been described that the charging/discharging operation is divided into operations of FIGS. 3A-3B and 4A-4B, the operations of FIGS. 3A-3B and 4A-4B may be sequentially repeated.

That is, the controller 80 may repetitively perform the operations of FIGS. 3A to 4B, so that charging/discharging current repetitively flows into and out of the battery 60. Thus, the temperature of the battery 60 is increased by the current.

Subsequently, if the temperature of the battery 60 reaches a normal temperature range, the controller 80 finishes the operation of the temperature controlling system according to this embodiment, and performs the basic operation of the energy storage system 100.

That is, the energy storage system 100 is coupled to the load 2 and the grid 1 by turning on the switches 71 and 72 of the load linker 70 and the switches 41 and 42 of the grid linker 40.

The third switch 37 included in the inverter 30 is turned off, thereby performing only the basic bidirectional inverting operation of the inverter 30. Similarly, the third switch 54 included in the converter 50 is also turned off, thereby performing only the basic bidirectional converting operation of the converter 50. That is, the charging/discharging current path formed in the operation of the temperature controlling system is blocked.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A temperature controlling system for a battery in an energy storage system, the temperature controlling system comprising:
   a converter comprising a plurality of switches and a converter inductor, the converter being configured to increase or decrease a voltage of the battery;
   a DC linker comprising first and second capacitors that are coupled in series and configured to stabilize an output voltage of the converter; and
   an inverter comprising a plurality of switches and an inductor, the inverter being configured to invert an input voltage,
   wherein the inverter further comprises a switch coupled between a terminal of the inductor and a first node between the first and second capacitors of the DC linker to provide a current from the inductor to the battery.

2. The temperature controlling system of claim 1, wherein the converter comprises:
   the converter inductor coupled to a first terminal of the battery;
   a first switch coupled between a first terminal of the first capacitor of the DC linker and a second terminal of the converter inductor; and
   a second switch coupled between the second terminal of the converter inductor and a second terminal of the battery.

3. The temperature controlling system of claim 2, further comprising a third switch coupled between the first terminal of the battery and the first terminal of the first capacitor of the DC linker.

4. The temperature controlling system of claim 1, wherein the switches of the inverter are implemented in a half-bridge structure.

5. The temperature controlling system of claim 4, wherein the switches of the half-bridge structure include:
- a first switch coupled between a first terminal of the first capacitor of the DC linker and a first terminal of the inductor; and
- a second switch coupled between the first terminal of the inductor and a second terminal of the battery.

6. The temperature controlling system of claim 5, wherein the inductor is coupled between a second node between the first and second switches and a first switch of a load linker, the load linker being configured to control a linkage between the energy storage system and a load.

7. The temperature controlling system of claim 5, further comprising a third switch coupled between a second terminal of the inductor and the first node between the first and second capacitors of the DC linker.

8. A temperature controlling method for a battery in an energy storage system comprising:
- sensing a low-temperature state of the battery in the energy storage system being maintained for a period of time;
- disconnecting a grid and a load from the energy storage system and forming a charging/discharging current path through which current generated from an inverter in the energy storage system is provided to the battery in response to the low-temperature state of the battery being maintained for the period of time; and
- repetitively performing a charging/discharging operation of the battery through the charging/discharging current path by alternately operating a plurality of switches of the inverter.

9. The temperature controlling method of claim 8, further comprising coupling the load and the grid to the energy storage system and blocking the formed charging/discharging current path after the temperature of the battery reaches a normal temperature range.

10. The temperature controlling method of claim 8, wherein the plurality of switches of the inverter are implemented in a half-bridge structure.

11. The method of claim 8, wherein the charging/discharging current path is formed after disconnecting the grid and the load from the energy storage system.

12. The method of claim 11, wherein the charging/discharging operation of the battery is performed after the forming of the charging/discharging current path.

* * * * *